Patented June 6, 1950

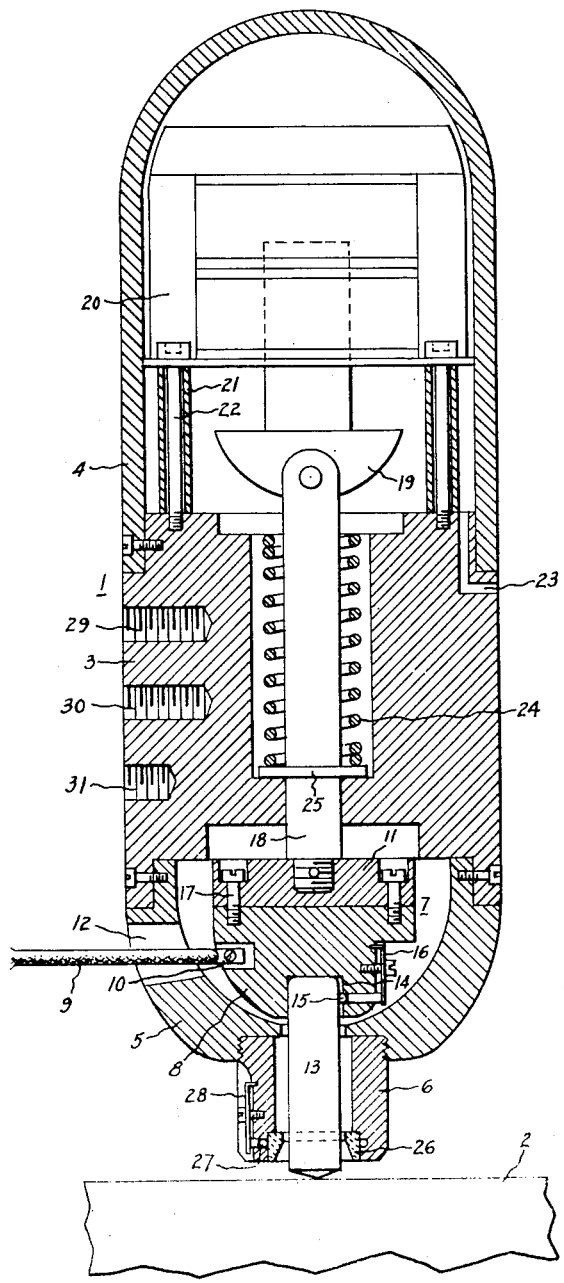

2,510,620

UNITED STATES PATENT OFFICE 2,510,620

ARC STUD WELDING GUN

Kenneth C. Craven, Fitchburg, Mass., assignor to General Electric Company, a corporation of New York Application September 10, 1949, Serial No. 114,989

4 Claims. (Cl. 219—4)

My invention relates to the welding of a metal stud to a metal body or workpiece, and has for its object the provision of a simple, reliable and compact stud welding gun.

More specifically, my invention relates to a stud welding gun that can be attached to an element of a machine to form the welding head thereof, or can be used by hand in which case a suitable handle is attached.

Another object of my invention is to provide a stud welding gun in which the welding circuit is effectively insulated from the circuit of the operating solenoid and in which the solenoid operating element is sufficiently removed from the arc to protect it from damage due to heat.

One arrangement in use for welding studs to metal bodies employs a ceramic ring or ferrule around the weld end of the stud to facilitate the welding operation. The studs being welded may be in the shape of a pin to be bent over after insulation is applied or may be threaded as when they are to be used to hold a wooden flooring in place on a steel structure. They may also be formed of less expensive metal and welded to serve as tongs to position blanks of valuable alloys during forging operations to save an extra heating and drawing operation. The studs themselves may be of either circular or non-circular cross-section. In all of these cases the same ceramic ring or ferrule may be used for studs having an equal maximum cross-sectional dimension since the clearance between the ring and the stud is not critical.

Another object of my invention, is to provide a retaining device within the gun itself to hold the ceramic ring during the welding operation.

For a more complete understanding of my invention, reference is made to the accompanying drawing, the single figure of which is a sectional view of one embodiment of my invention adjacent a workpiece to which a stud is to be welded.

Referring to the drawing, I have shown a stud-welding gun 1 adjacent a metal workpiece 2. The frame of the gun 1 comprises a cylindrical body section 3, a domed cover 4 and a domed nose 5 secured to the body section 3. The nose 5 threadedly supports a replaceable tubular section 6, the length of which depends upon the length of the stud to be welded. The nose may be suitably formed of either a metal or a non-conducting material such as plastic. When metal is used, the nose is insulated from the body section 3 and from the welding conduit extending through the nose.

A stud holder 7 extending into the nose comprises an electrically conducting head 8, to which is attached a cable 9 at a terminal post 10, and an adapter 11. The cable 9 extends through an aperture 12 in nose 5. A stud 13 is shown in position in a cavity 14 of head 8. Cavity 14 is provided peripherally with a plurality of balls 15 biased towards the center of the cavity by springs 16 to grip the end of the stud 13. The adapter 11 is secured to head 8 by bolts 17 and is electrically insulated from the head. A rod 18 has its lower end attached to adapter 11 and its upper end to a plunger 19 of a solenoid 20 mounted upon a plurality of pillars 21 and secured thereto by bolts 22. Wires of the solenoid circuit lead to an outside circuit (not shown) through holes 23. A spring 24 bearing upon a flange 25 of rod 18 biases the rod away from the solenoid.

A ceramic ring or ferrule 26 having an inside diameter greater than the diameter of stud 13 is inserted in the tubular section 6 and held in position by a plurality of balls 27 positioned around the circumference of the tubular section and biased toward the center thereof by springs 28.

As ring 26 is held by the gun itself the necessity of holding the inside diameter of the ring to a close tolerance and of assembling the ring to stud 13 is eliminated. Further, while the ceramic ring is eventually destroyed in use, the fact that there is clearance between the ring and the stud and that the ring is carried by the gun permits the gun to be slipped off the stud so that the ring can be reused in successive weldings, effecting a further saving in ceramic rings.

In addition to forming a support for the ceramic ring, the nose and tubular sections particularly in the configuration illustrated in the drawing, provide protection against injury for the stud holder 7 and the rod 18. Likewise, location of the solenoid coil in the end of the gun opposite the stud holder protects the coil from the heating effect of the arc.

In operation, a ceramic ring 26 is positioned within barrel 6 and a stud 13 is pushed into the stud holder 7. The gun is pressed against the work 2 over the spot to which the stud is to be welded, thereby causing the stud holder to be pushed upward against the spring 22. A hand switch (not shown) on the gun or readily accessible to the welder then may be used to connect a supply of current to conductor 9 in the main welding circuit and to connect a current supply to the coil of solenoid 20. These circuits may be energized simultaneously or with an interval between them as in the case where a preliminary preheating with the stud in contact with the workpiece is required.

A suitable control embodying solenoid 20 is employed for retracting the stud and the head against action of the spring 24 to draw an arc between the stud and the work. At the end of a predetermined time interval the solenoid is deenergized and spring 24 forces the stud into welding engagement with the workpiece. When the metal has solidified, the stud is welded to the workpiece. The gun is then lifted from the stud in the direction of the stud axis. If the ceramic ring has not ben damaged in the process, it may be used during subsequent welding operations.

Holes 29, 30, and 31 are tapped in the side of the cylindrical body section 2 so that the stud welding gun can be attached to a machine or supplied with a suitable handle to make it portable.

Alternately, a switch actuated by the travel of rod 18 as the gun is passed towards the workpiece may be employed to operate the control mechanism instead of the hand operated switch described.

While certain specific embodiments have been shown an described, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. A stud welding gun for effecting the welding of metallic parts such as studs to metallic bodies comprising a cylindrical body section, a domed cover and a domed nose section removably attached to said body section, a tubular section communicating into said nose section, a solenoid provided with a plunger mounted upon said body section, a rod provided with a flange slidably mounted in said body section and pivotally attached to said plunger, spring means biasing said plunger away from said solenoid, an adapter mounted upon said rod and an electrically conductive stud holder mounted upon and electrically insulated from said adapter, said stud holder having a cylindrical cavity therein, a plurality of spring biased ball retainers mounted around the periphery of said cylindrical cavity to grasp a stud therebetween, and a plurality of spring biased ball retainers mounted around the periphery of said tubular section to grasp a ceramic ring therebetween.

2. In an arc stud welding gun including a frame, stud holding means for frictionally engaging the end of a stud and imparting lengthwise movement thereto relative to said frame, a member mounted on said frame and enclosing said holding means, said member having an opening centered in the line of movement of a stud and said stud extending through said opening, and means aligned with said opening mounted upon said member for frictionally retaining a non-metallic ring member about the arcing end portion of said stud coaxially with said line of movement.

3. In an arc stud welding gun including a center section, a nose mounted upon said center section, a stud holder linearly movable within said nose and a tubular section replaceably mounted upon said nose communicating into said nose and having its axis coincidental with the line of movement of said stud holder to enclose a stud held by said stud holder, and friction means mounted within the outer wall of said tubular section to retain a non-metallic ring concentric with said tubular section.

4. A stud welding gun for effecting the welding of metallic parts such as studs to metallic bodies comprising a cylindrical body, a domed cover and a domed nose removably attached to and forming compartments at opposite ends of said body section, an electrically conductive stud holder and an adapter mounted together and linearly movable within said nose compartment, said holder being electrically insulated from said adapter, said stud holder having a cavity therein, a plurality of spring biased ball retainers mounted around the periphery of said cavity to grip one end of a stud therein, binding post means mounted upon said stud holder, a cable secured to said binding post means extending through said nose and insulated therefrom, a solenoid provided with a plunger mounted upon said body section within said cover compartment, a rod provided with a flange slidably mounted in said body section and connected between said plunger and said adapter to transmit linear motion therebetween, spring means mounted in said body section and engaging said flange to bias said holder away from said solenoid, a tubular section mounted upon said nose communicating therein and mounted with its axis coincident with the line of said linear motion, and friction retaining means mounted within the outer walls of said tubular section to removably retain a non-metallic ring concentric therewith.

KENNETH C. CRAVEN.

REFERENCES CITED

The following references are of record in the file of this patent:

UNITED STATES PATENTS

| Number | Name | Date |
|---|---|---|
| 1,359,620 | Ritchey et al. | Nov. 23, 1920 |
| 1,917,531 | Lincoln | July 11, 1933 |
| 2,265,169 | Hughes et al. | Dec. 9, 1941 |
| 2,342,144 | Hughes | Feb. 22, 1944 |
| 2,439,830 | Varela | Apr. 20, 1948 |